United States Patent [19]
Leff et al.

[11] Patent Number: 4,783,843
[45] Date of Patent: Nov. 8, 1988

[54] SPLIT BAND FILTER FOR CELLULAR MOBILE RADIO

[75] Inventors: Barry J. Leff, Belmont; Edward R. Johnson, Sunnyvale; Joseph F. Lutz, San Jose, all of Calif.

[73] Assignee: Peninsula Engineering Group, Inc., San Carlos, Calif.

[21] Appl. No.: 866,270

[22] Filed: May 23, 1986

[51] Int. Cl.⁴ .............................................. H04B 7/14
[52] U.S. Cl. ...................................... 455/22; 455/20; 455/314; 455/315; 455/339
[58] Field of Search ....................... 455/15, 16, 20, 22, 455/314, 315, 339; 370/26; 379/338, 344; 333/167, 178

[56] References Cited

U.S. PATENT DOCUMENTS

| | | | |
|---|---|---|---|
| 2,407,213 | 9/1946 | Tunick | 455/22 |
| 2,871,294 | 1/1959 | Stachiewicz | 455/15 |
| 4,001,691 | 1/1977 | Greenberg | 455/22 |

OTHER PUBLICATIONS

"Electronic Industries", pp. 58–63, 11/1965.

Primary Examiner—Michael A. Masinick
Attorney, Agent, or Firm—Edward B. Anderson; Michael A. Glenn

[57] ABSTRACT

A split band filtering scheme to reduce adjacent band interference in a communications network, such as a cellular mobile radio system, is disclosed. A repeater, interposed between a base or cell site and a mobile/portable radio, includes a down converter for converting a system operating frequency to a lower frequency signal. The lower frequency signal represents a communications band. The signal is presented to a split band filter having a narrow passband with steep skirts. The processed signal is coupled to an up converter where it is restored to the system operating frequency. In this way, the passband of the repeater is restricted to that of the desired communications band and adjacent band interference is reduced or eliminated.

8 Claims, 2 Drawing Sheets

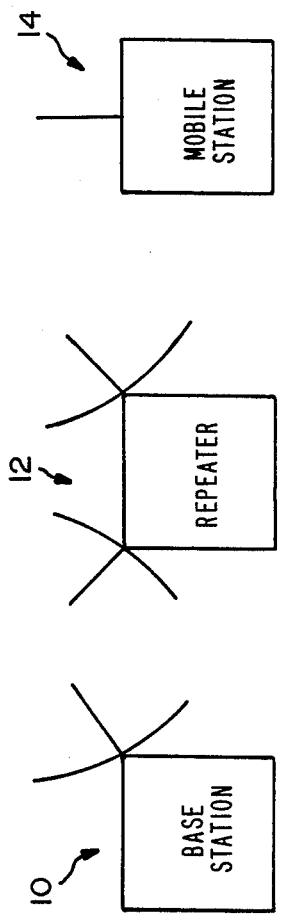
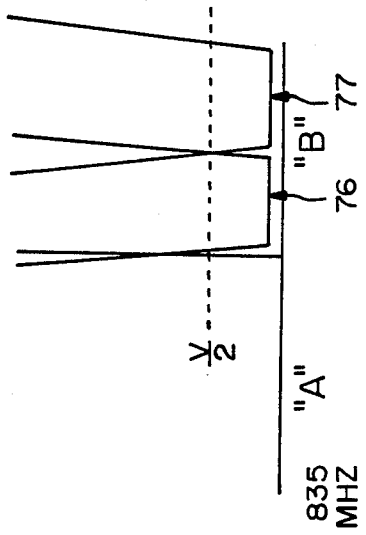
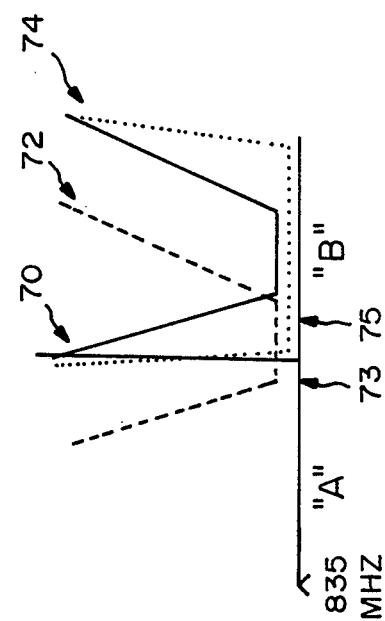
FIG. 1
FIG. 4
FIG. 3

SPLIT BAND FILTER FOR CELLULAR MOBILE RADIO

BACKGROUND OF THE INVENTION

1. Technical Field

The present invention relates to cellular mobile radio. More particularly, the present invention relates to the elimination of interference between adjacent channel competing services in cellular mobile radio markets.

2. Description of the Prior Art

The emerging field of telecommunications referred to as cellular mobile radio provides ready access to mobile telephone services for a great multitude of subscribers at reasonable cost. Such mobile communications must provide reliable, quality information transfer within a given market area, whether or not the market area is relatively flat, such as Cleveland; densely populated with large structures, such as New York City; or mountainous, such as Los Angeles.

U.S. Pat. Nos. 4,525,861 (Zoned Data Communications System for Communicating Message Signals Between Portable Radios and a Host Computer) and 4,545,071 (Portable Radio For A Zoned Data Communications System Communicating Message Signals Between Portable Radios and A Host Computer) describe the basic scheme by which a plurality of channels in adjacent bands are assigned automatically to a plurality of portable radios (mobile telephones) based on channel use and proximity of the portable radios to geographically dispersed transmitter-receivers. Typically, such scheme involves two adjacent 10 MHz bands, each band including 333 channels, each channel spaced 30 kHz apart. Each 10 MHz band is assigned to a competing company that provides services to a local market. One band is assigned to a telephone operating company, such as New Vector (referred to as the wireline service); the other band is assigned to an independent company, such as Cellular One (referred to as the nonwireline service).

Channels are assigned to mobile/portable radios by a central computer to provide optimum use of the channels in each band. The central computer controls a plurality of transmitter/receivers or cell sites within the serviced geographic region. Because such services are generally provided at 835/880 MHz, the propagated signals act more like microwaves than radio frequency signals and are limited to line of sight transmission. This characteristic of the 835 MHz band is exploited to produce a reuseable spectrum by which a given mobile/portable radio is assigned to its nearest cell site on an unoccupied channel. As the portable radio moves from one cell site to another, it is switched to the nearer cell site and assigned to an unoccupied channel, all without interrupting the exchange of information over the portable radio.

One problem inherent in a service operating at frequencies as high as 835/880 MHz is that the signals do not go through hills, tall buildings, or other obstructions. This produces blind spots in the serviced area that may interfere with or entirely interrupt the use of portable radios. One approach to eliminate this problem is to add cell sites to the system. Such additions are costly, running $500K or more per cell site.

A simple solution to the problem of blind spots in a cellular mobile radio system is to add RF repeaters to affected cell sites. Such repeaters are relatively straightforward and inexpensive, running about $50K per site. However, RF repeaters are broadband amplifiers - they must amplify signals in the entire 10 MHz band they service. The broadband nature of the RF repeater makes it very difficult to amplify the entire spectrum of the 10 MHz band without interfering with the adjacent band.

Some repeaters include filters to steepen the skirts at the edges of the amplified band. Simple, effective filters cannot be built for the 835/880 MHz bands. Accordingly, a system operator is faced with the choice of shifting the amplified portion of the 10 MHz band away from the adjacent 10 MHz band and, in the process, losing communications and control channels within his band (and thus limiting the capability of the system), or shifting the amplified portion into the adjacent band (after obtaining permission from a competitor) and tolerating the interference between the channels in the adjacent bands.

SUMMARY OF THE INVENTION

The present invention provides a filter, incorporated within a repeater, that reduces or eliminates the problem of adjacent band interference within a communications system, such as a cellular mobile radio system. In one embodiment of the invention, at least two filters are coupled within a repeater signal path. Each filter is a passband filter having a different center frequency. The filters are arranged to cooperate such that their displaced and overlapping passbands at the half voltage response points provide a narrow repeater band having steep skirts.

Another embodiment of the invention includes a down converter within the repeater signal path. Because communications systems often operate at very high frequencies, ultra high frequencies (VHF/UHF) or in the microwave spectrum (SHF), the design of efficient filters is difficult and expensive. Down converting allows the repeater's passband to be filtered at a lower frequency where effective, efficient, and inexpensive filters may be provided. After filtering, the processed signals are up converted and retransmitted by the repeater. To assure stability during the up-converting/down-converting process, a common local oscillator is included to coordinate the conversion processes.

Another embodiment of the invention combines down-conversion/up-conversion with at least two filters having displaced and overlapping passbands at the half voltage response points. In this way, the processed band is broken into two or more segments. Each segment is indpendently filtered by a separate filter. Thus, a series of adjacent filter passbands assemble a repeater passband. By exploiting the characteristics of filters to provide steeper skirts for narrower bands at lower frequencies, the present invention thus provides an inexpensive yet effective device and process for limiting the passband of a high frequency (VHF, UHF, SHF) repeater and thus reduce or eliminate adjacent band interference.

BRIEF DESCRIPTION OF THE FIGURES

FIG. 1 is a block diagram of a cellular mobile radio telephone system incuding a repeater;

FIG. 3 is a graphic representation of adjacent 10 MHz bands showing passbands produced by prior art filter schemes and those produced by an embodiment of the present invention; and FIG. 4 is a graphic representation of superimposed passbands within a 10 MHz band, as produced by an embodiment of the invention.

DETAILED DESCRIPTION OF A PREFERRED EMBODIMENT

Figure 2:
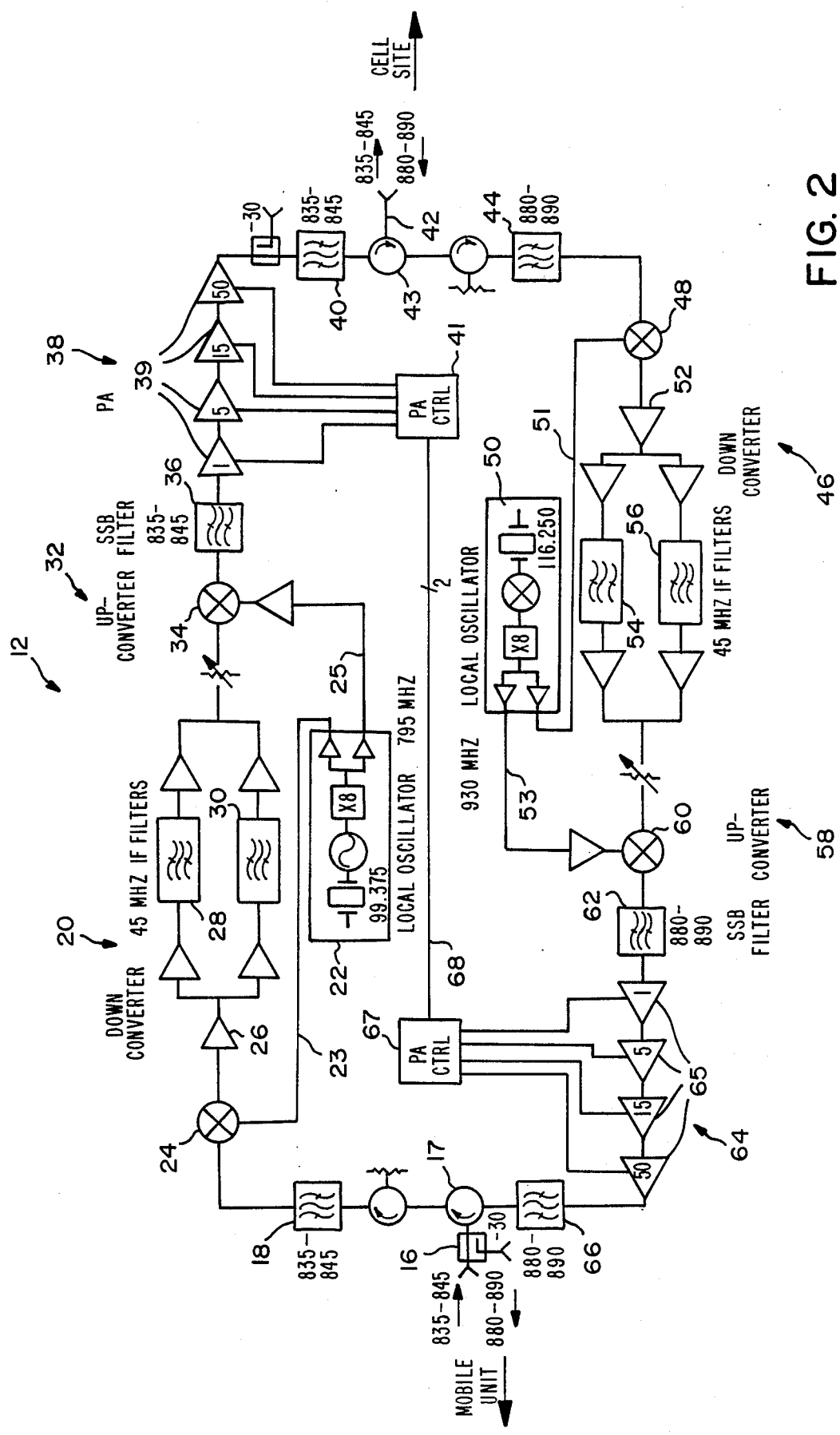
FIG. 2 is a block diagram of an embodiment of the present invention.

The present invention finds application in a communications system, such as the cellular mobile radio system shown in block diagram form in FIG. 1, that includes a base station or cell site 10 and a mobile station 14, interconnected by a repeater 12.

A preferred embodiment of the invention is shown in block diagram form in FIG. 2. Repeater 12 is configured to relay communications signals between a mobile unit and a cell site. In the example of FIG. 2 repeater 12 receives, amplifies, and retransmits signals to and from each of the cell site and mobile unit - operation between the mobile unit and cell site being in the 835-845 MHz band and operation between the cell site and mobile unit being in the 880-890 MHz band.

Signals from the mobile unit are received by antenna 16 and directed along a signal processing path by separator 17 where they are filtered and amplified before being directed to antenna 42 by separator 43 for propagation to the cell site. Likewise, signals from the cell site are received by antenna 42 and directed along a separate signal processing path by separator 43 where they are filtered and amplified before being directed to antenna 16 by separator 17 for propagation to the mobile unit.

The signal processing path from the mobile unit to the cell site includes a band pass filter 18 having a passband of 835-845 MHz. Filter 18 is included to provide initial shaping of the repeater's passband, although operation of filter 18 alone without that of the present invention would produce a passband similar to that of the prior filtering schemes, shown as curves 70 and 72 in FIG. 3.

As discussed above, such filtering produces a passband with broad skirts which must either be shifted into an adjacent band (as shown by curve 72 in FIG. 3) with resulting interference to and from the service on the adjacent band, or must be shifted into the desired band (as shown by curve 70 in FIG. 3) with resulting loss of useable spectrum within the band. As will be disclosed herein, the present invention produces a curve similar to curve 74 in FIG. 3, exhibiting steep skirts. As such, loss of useable spectrum within the assigned band and interference with adjacent bands is significantly reduced or entirely eliminated.

Referring again to FIG. 2, the filtered signal from filter 18 is coupled to mixer 24. Mixer 24 allows the 835-845 MHz signal from filter 18 to be heterodyned with a signal produced by local oscillator 22 which operates at 795 MHz in this embodiment of the invention. The resulting difference signal of 45 MHz is presented to buffer 26 and thence to filters 28 and 30. Mixer 24, buffer 26, and filters 28 and 30 make up down converter 20.

This embodiment of the invention provides a common local oscillator 22 for both down converter 20 and for up converter 32. The output of local oscillator 22 is coupled to down converter 20 and up converter 32 by lines 23 and 25, respectively. Although other embodiments of the invention may be provided without a common local oscillator for both up conversion and down conversion, the use of a common local oscillator is found to improve stability of the signal processing path and eliminate drift and other processing errors. Local oscillator 22 may be crystal controlled or may be of any other type of stable oscillator suitable for heterodyning applications.

Filters 28 and 30 are band pass filters having a narrow passband and steep skirts. The center frequency of each filter is skewed from that of the other filter such that the passbands of the two filters overlap at the half voltage points (6 dB down from minimum loss). FIG. 4 shows curves 76 and 77 as the skewed and overlapping passbands of filters 28 and 30. The combination of the two narrow bandpasses with offset center frequencies results in the desired broad bandpass with a center frequency between the center frequencies of the two narrow-bandpass filters. In effect, then, a split-band filter is formed by splitting the broad passband into two or more narrower passbands, each of which narrower passbands is provided by one of the individual filters, such as filters 28 and 30.

It is difficult to design and expensive to manufacture filters that provide wide passbands and steep skirts. Accordingly, the present invention provides at least two filters in the signal processing path, each of which is centered on a portion of the spectrum of concern. Any number of filters could be provided in various embodiments of the present invention, depending on the width of the desired passband and the frequency at which processing in done.

It is important to note that it is the overlap of each of the filters, each filter narrowly passing just a portion of the desired spectrum, that effects selective, wide band signal processing. Filters of the type found useful in the present invention, such as filter 28 and 30, may be of the type known in the art for effecting a band pass function.

Low pass and high pass filters may also be used at the edges of a passband to further steepen the skirts of the passband. By exploiting the availability of easily designed, inexpensive bandpass, low pass, and high pass filters for operation in lower frequency bands the present invention provides steep skirts and broad passbands and, thus reduces or eliminates adjacent channel interference, as in a repeater operating in a cellular mobile radio system. Once filtered, the signals are coupled to up converter 32 which consists of mixer 34 and local oscillator 22. The up converted signal is further filtered by filter 36 and then amplified by power amplifier 38 that includes a series of amplifier stages 39 under control of amplifier control circuit 41. A similar amplifier control circuit 67 is provided for the cell site to mobile unit path. Operation of the two control units is coordinated by a control line 68. Of course, some embodiments of the invention may not include such control and amplification circuitry.

The processed and amplified signal is passed through a final band pass filter 40 and through separator 43 to antenna 42. The resulting signal contains only components of the original signal. Signals in adjacent bands are effectively filtered prior to amplification and are thus rejected by a repeater incorporating the present invention. Because the present invention only amplifies signals within a desired passband, it is unlikely that a repeater incorporating the present invention could interfere with services in adjacent bands.

Signal processing and amplification from the cell site to the mobile unit is effected in a similar manner. Cell site signals received at antenna 42 are directed to filter 44 by separator 43. The filtered signals from filter 44 are coupled to down converter 46 that includes mixer 48, coupled to local oscillator 50 by line 51. The difference signal produced by the heterodyning process at mixer 48 is coupled through buffer 52 to band pass filters 54 and 56 which cooperate in the manner described above for filter 28 and 30. The filtered signals are up converted by up converter 58 which includes mixer 60 coupled to local oscillator 50 by line 53. The result of heterodyning at mixer 60 is a signal coupled through filter 62 and amplified by amplifier 64, which includes amplifier stages 65 and control circuit 67. The amplified and processed signal is then coupled through filter 66 and directed by separator 17 to antenna 16 for transmission to the mobile unit.

Although this example of the invention discloses a repeater that is bidirectional in operation and is concerned with a cellular mobile radio system, the invention is effectively used in repeaters that are unidirectional and other information transfer systems and networks, as well as in high frequency (VHF, UHF, SHF) and microwave signal processing circuitry where high selectivity is required and difficult to achieve at operating transmission frequencies.

Additionally, although certain bands and frequencies were discussed herein, it should be appreciated that the present invention finds application in all VHF and higher frequency signal processing applications (e.g. UHF/SHF). Accordingly the present invention is not limited to those frequencies set forth herein

We claim:

1. A filter, comprising:
    at least two filter means, each having a filter input and a filter output, for attenuating transmission of signals therethrough above and below a filter means center frequency;
    each of said filter means having a center frequency spaced from that of the other filter means to displace the filter passbands of each filter means such that the passbands overlap at a passband half voltage point; and
    means for combining said outputs of each of said filter means;
    whereby said filter means cooperate to provide a broad passband formed of the passbands of each of said filter means and having steep skirts that accordingly restrict said filter's passband.

2. The filter of claim 1, further comprising:
    frequency converter means for changing the frequency of signals to an optimum frequency for effecting operation of said filter means.

3. The filter of claim 2, said frequency converter means further comprising:
    down converter means, connected to the input of said filter means, for converting the frequency of signals received at said filter to a lower frequency:
    up converter means, connected to the output of said filter means, for converting the frequency of signals processed by said filter means to the frequency of said signals received at said filter:
    whereby said signals output from said filter are restricted within a narrow filter passband.

4. The filter of claim 3, further comprising:
    oscillator means for effecting coordinated operation of said up converter means and said down converter means.

5. A filter for filtering transmission signals comprising:
    down converter means, having an input coupled to receive said transmission signals, for converting said received signals to a lower frequency and for providing said lower frequency signals to a down converter output;
    at least two filter means, each having a filter input coupled to receive said lower frequency signals from the output of said down converter means, and a filter means output, for attenuating transmission of said lower frequency signals therethrough above and below a filter means center frequency;
    each of said filter means having a center frequency spaced from that of the other filter means to displace the passbands of each filter means such that the passbands overlap at a filter passband half voltage point;
    means for combining the outputs of each of said filter means;
    wherein said filter means cooperate to provide a broad passband having steep skirts and being formed of the combined passbands of each of said filter means; and
    up converter means, having an input coupled to receive signals from said combined filter means outputs, for converting said filter means output signals to the frequency of said signals received at said filter;
    whereby said signals output from said filter are restricted within a narrow repeater passband.

6. The filter of claim 5, said up converter means and down converter means further comprising:
    oscillator means for effecting coordinated operation of said up converter means and said down converter means.

7. A split band filter, comprising:
    down converter means, having an input coupled within said filter to receive signals within a filter signal path, for producing a signal at a down converter means output having a frequency lower than that of said received signals;
    at least two filter means, each having a filter input coupled to receive signals from said down converter and a filter output, for attenuating transmission of signals therethrough above and below a filter means center frequency;
    each of said filter means having a center frequency spaced from that of each other filter means to displace the passbands of each filter means such that the passbands overlap at a filter passband half voltage point;
    means for combining each of the outputs of said filter means; and
    up converter means, having an input coupled to the combined outputs of each of said filter means, for producing a signal at an up converter means output at the same frequency as that of said received signals;
    whereby signals output from said filter are restricted within a narrow filter passband.

8. The split band filter of claim 7, said up converter means and down converter means further comprising:
    oscillator means for effecting coordinated operation of said up converter means and said down converter means.

* * * * *